July 12, 1949.  T. G. DEVINE  2,475,824
FOOD SLICER
Filed Sept. 7, 1946
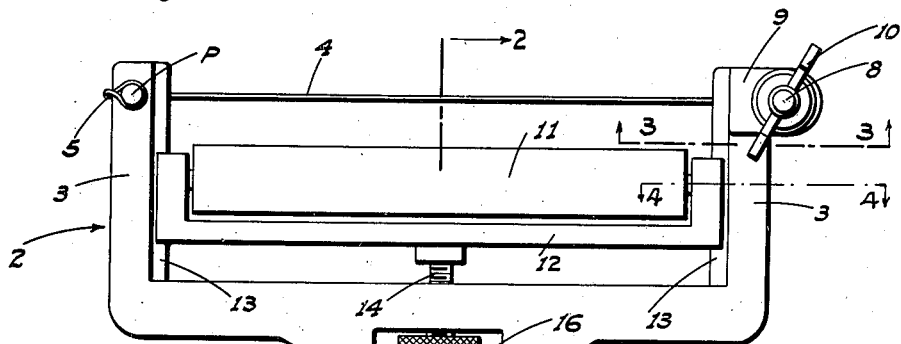
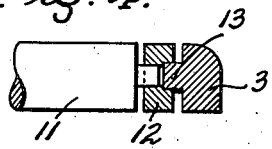
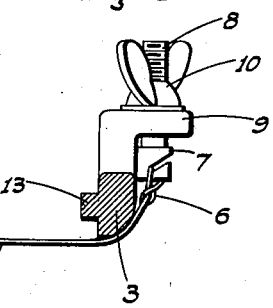
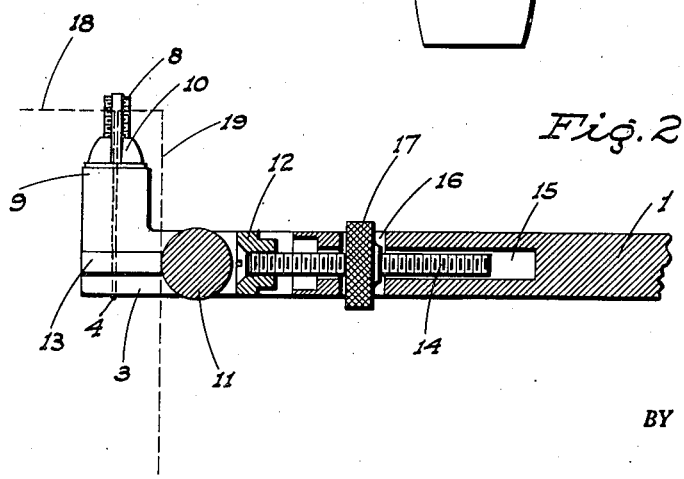
INVENTOR.
Thos. G. Devine
BY
ATTYS Patented July 12, 1949

2,475,824

UNITED STATES PATENT OFFICE 2,475,824

FOOD SLICER

Thomas G. Devine, Stockton, Calif.

Application September 7, 1946, Serial No. 695,424

2 Claims. (Cl. 30—116)

This invention is directed to, and it is an object to provide, an improved food slicer, especially for food in block form, such as cheese, butter, and the like.

Another object of the invention is to provide a food slicer, for the purpose described, which is designed to be hand-supported and manipulated, yet operative to produce a food slice of constant or even thickness, as is desirable.

A further object of the invention is to provide a food slicer, as above, which is adjustable to cut food into slices of selective thickness.

An additional object of the invention is to provide a food slicer which comprises a handle having a relatively wide fork on one end spanned by a taut cutting wire, and a guide roller mounted in the fork parallel to but manually adjustably spaced from said wire; there being novel means employed to adjust the spacing of the roller relative to the wire.

A further object of the invention is to produce a practical food slicer, and one which will be exceedingly effective for the purpose for which it is designed.

These objects are accomplished by means of such structure and relative arrangement of parts as will fully appear by a perusal of the following specification and claims.

In the drawings:

Fig. 1 is a plan view of the improved food slicer.

Fig. 2 is a fragmentary sectional elevation on line 2—2 of Fig. 1.

Fig. 3 is a fragmentary cross section on line 3—3 of Fig. 1.

Fig. 4 is a cross section on a line 4—4 of Fig. 1.

Referring now more particularly to the characters of reference on the drawings, the improved food slicer comprises a longitudinal handle 1 formed at its forward end with a relatively wide fork 2, which includes short, forwardly projecting arms 3 in rigid integral relation.

A taut cutting wire 4 extends between the arms 3 adjacent their outer ends, crossing the under side thereof, and thence being looped, as at 5 and 6. The loop 5 engages about an anchor pin P on the top of one arm, while the loop 6 hookingly engages with a slotted head 7 of an upstanding adjustment screw 8 which slidably extends through a laterally projecting ear 9 on the other arm 3. A wing nut 10 on the screw 8 bears against the ear 9 on top thereof and serves to adjust said screw, which in turn imparts the necessary tension to the wire 4.

An elongated guide roller 11 is disposed in spaced parallel relation to the wire 4 rearwardly thereof, i. e. between the arms 3; said guide roller being substantially full length relative to said wire.

The guide roller 11 is journaled in a forwardly opening, relatively wide yoke 12 slotted at the ends and slidably mounted on longitudinal guide ribs 13 formed on the adjacent faces of the arms 3. The roller supporting yoke 12 is adjustable, relative to the wire 4, by means of the following mechanism:

A longitudinal screw 14 is fixed to the yoke 12, centrally of its ends, and projects rearwardly into a longitudinal bore 15 in the forward portion of the handle 1. Intermediate the ends of said bore 15 the handle is slotted therethrough from top to bottom, as at 16; said bore 15 intersecting such slot. A circular adjustment nut 17 is threaded on the screw 14, and is disposed in the slot 16 for manual access. The adjustment nut 17 is knurled, at the periphery, as shown, and is of a diameter such that it projects somewhat above and below the surfaces of the handle 1, for ease of manipulation.

Upon manual rotation of the adjustment nut 17 in one direction or the other, the screw 14, together with the roller supporting yoke 12, is either advanced or retracted relative to the wire 4, whereby to selectively vary the spacing between said wire and the roller 11. This controls the thickness of the food slice cut by the device, which device functions as follows:

With the handle 1 engaged in one hand, after proper adjustment of the roller 11, the wire 4 is engaged on top of a food block 18 of cheese, butter, or the like, with the roller bearing against one end of said block. Thereafter, the entire device is pressed downwardly, causing the wire to slide through the block, cutting a slice 19 therefrom in the manner illustrated in Fig. 2.

By reason of the roller arrangement, the slice 19 as cut from the food block 18 is of constant or even thickness. The described food slicer provides an effective and easily manipulated device for the slicing of block foods; is simple and practical in construction; and can be readily dismantled for cleaning.

From the foregoing description it will be readily seen that there has been produced such a device as substantially fulfills the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention the following is claimed as new and useful, and upon which Letters Patent are desirable:

1. A food slicer comprising a handle provided at one end thereof with a relatively wide fork having two arms, a taut cutting wire spanning said fork and connected to the arms thereof, a guide roller disposed in the fork parallel to but spaced rearwardly of said wire, and means mounting the roller in connection with the fork for selective adjustment relative to said wire; said mounting means comprising a relatively wide, forwardly opening yoke in which the roller is journaled, longitudinal guides between opposite ends of said yoke and corresponding arms of the fork, a longitudinal screw fixed in connection with the yoke intermediate its ends and projecting rearwardly, the handle having a longitudinal bore into which said screw extends, and said handle being slotted therethrough intermediate the ends of the bore, and an adjustment nut threaded on the screw and disposed in said slot for manual access.

2. A food slicer comprising a handle provided at one end thereof with a relatively wide fork, having two arms, a taut cutting wire spanning said fork and connected to the arms thereof, a guide roller disposed in the fork parallel to but spaced rearwardly of said wire, a relatively wide yoke in which said roller is journaled, longitudinal guide ribs on adjacent faces of the fork arms, corresponding ends of the yoke being slotted and relatively slidably receiving said ribs therein, and manual means arranged to adjust said roller supporting yoke in the fork and relative to said wire, said means including an elongated screw fixed in connection with the yoke intermediate its ends and projecting rearwardly, the handle having a longitudinal bore into which said screw extends, and said handle being slotted therethrough intermediate the ends of the bore, and an adjustment nut threaded on the screw and disposed in said slot for manual access.

THOMAS G. DEVINE.

REFERENCES CITED

The following references are of record in the file of this patent:

UNITED STATES PATENTS

| Number | Name | Date |
| --- | --- | --- |
| 1,533,445 | Moller | Apr. 14, 1925 |
| 2,093,867 | Fitzgerald | Sept. 21, 1937 |

FOREIGN PATENTS

| Number | Country | Date |
| --- | --- | --- |
| 218,736 | Germany | Feb. 8, 1910 |